US008116745B2

(12) United States Patent
Lee (10) Patent No.: US 8,116,745 B2
(45) Date of Patent: Feb. 14, 2012

(54) METHOD FOR DISPLAYING CALLER INFORMATION OF PORTABLE DEVICE

(75) Inventor: Su-Seon Lee, Sungnam (KR)

(73) Assignee: KT Tech, Inc., Gyeonggi-do (KR)

( * ) Notice: Subject to any disclaimer, the term of this patent is extended or adjusted under 35 U.S.C. 154(b) by 560 days.

(21) Appl. No.: 12/227,632

(22) PCT Filed: May 23, 2007

(86) PCT No.: PCT/KR2007/002509
§ 371 (c)(1),
(2), (4) Date: Nov. 24, 2008

(87) PCT Pub. No.: WO2007/139307
PCT Pub. Date: Dec. 6, 2007

(65) Prior Publication Data
US 2009/0176484 A1    Jul. 9, 2009

(30) Foreign Application Priority Data

May 25, 2006   (KR) .................. 10-2006-0046890

(51) Int. Cl.
*H04M 3/42*     (2006.01)
(52) U.S. Cl. ........ 455/413; 455/415; 455/417; 455/466; 379/88.12; 379/142.04; 379/142.17; 379/211.02
(58) Field of Classification Search .................. 455/413, 455/417, 466, 415; 370/260, 315, 352; 379/88.12, 379/142.04, 142.17, 211.02; 709/203, 205, 709/219; 707/104.1
See application file for complete search history.

(56) References Cited

U.S. PATENT DOCUMENTS

| | | | | |
|---|---|---|---|---|
| 7,251,318 B1 * | 7/2007 | Henderson | ............... | 379/142.04 |
| 7,254,223 B1 * | 8/2007 | Henderson | ............... | 379/142.04 |
| 7,257,210 B1 * | 8/2007 | Henderson | ............... | 379/142.04 |
| 7,266,186 B1 * | 9/2007 | Henderson | ............... | 379/142.04 |
| 7,286,658 B1 * | 10/2007 | Henderson | ............... | 379/142.04 |
| 7,305,076 B1 * | 12/2007 | Henderson | ............... | 379/142.04 |
| 7,308,088 B1 * | 12/2007 | Henderson | ............... | 379/142.04 |
| 7,310,416 B1 * | 12/2007 | Henderson | ............... | 379/142.04 |
| 7,349,532 B2 * | 3/2008 | Henderson | ............... | 379/142.04 |
| 7,426,264 B1 * | 9/2008 | Henderson | ............... | 379/142.04 |
| 7,454,000 B1 * | 11/2008 | Henderson | ............... | 379/142.04 |

(Continued)

FOREIGN PATENT DOCUMENTS

JP          11-298588        10/1999

(Continued)

OTHER PUBLICATIONS

Korean Office Action 9-5-2008-022872061 dated Apr. 28, 2008.

(Continued)

*Primary Examiner* — William D Cumming
(74) *Attorney, Agent, or Firm* — Harness, Dickey & Pierce, P.L.C.

(57) ABSTRACT

A method of displaying a caller information in a portable device includes setting up an item of the caller information of each caller, and displaying the caller information based on the set item of the caller information of a caller corresponding to a phone number of the caller when the portable device receives an incoming call. Accordingly, caller information desired by the user of the portable device may be displayed, and thus various and personalized caller information may be displayed.

6 Claims, 7 Drawing Sheets

U.S. PATENT DOCUMENTS

| | | |
|---|---|---|
| 2004/0146048 A1* | 7/2004 | Cotte .................. 370/352 |
| 2004/0148340 A1* | 7/2004 | Cotte .................. 709/203 |
| 2004/0148341 A1* | 7/2004 | Cotte .................. 709/203 |
| 2004/0148342 A1* | 7/2004 | Cotte .................. 709/203 |
| 2004/0148351 A1* | 7/2004 | Cotte .................. 709/205 |
| 2004/0148392 A1* | 7/2004 | Cotte .................. 709/225 |
| 2004/0264654 A1* | 12/2004 | Reding et al. ......... 379/88.12 |
| 2005/0053221 A1* | 3/2005 | Reding et al. ......... 379/211.02 |
| 2005/0182824 A1* | 8/2005 | Cotte .................. 709/217 |
| 2006/0123053 A1* | 6/2006 | Scannell, Jr. ......... 707/104.1 |
| 2007/0032225 A1* | 2/2007 | Konicek et al. ........ 455/417 |
| 2007/0121584 A1* | 5/2007 | Qiu et al. ............ 370/352 |
| 2007/0165554 A1* | 7/2007 | Jefferson et al. ...... 370/315 |
| 2008/0051066 A1* | 2/2008 | Bandhole et al. ....... 455/413 |
| 2009/0136013 A1* | 5/2009 | Kuykendall et al. ..... 379/142.17 |
| 2010/0020728 A1* | 1/2010 | Jefferson et al. ...... 370/260 |
| 2010/0099448 A1* | 4/2010 | Yim et al. ............ 455/466 |

FOREIGN PATENT DOCUMENTS

| | | |
|---|---|---|
| KR | 10-2003-0033563 | 5/2003 |
| KR | 10-2004-0036139 | 4/2004 |
| KR | 10-2004-0037386 | 5/2004 |
| KR | 10-2005-0113453 | 12/2005 |
| KR | 10-2006-0013803 | 2/2006 |

OTHER PUBLICATIONS

Office Action dated Apr. 28, 2008 in corresponding Korea Patent Application No. 10-2006-0046890.

* cited by examiner

METHOD FOR DISPLAYING CALLER INFORMATION OF PORTABLE DEVICE

TECHNICAL FIELD

The present invention relates to methods of displaying caller information of a portable device, and more particularly relates to methods of displaying caller information of a portable device capable of displaying phone number and additional information of the caller when the portable device receives call.

BACKGROUND ART

Typically, portable devices such as mobile communication device, and PDA (Personal Digital Assistants) provide not only voice communication service using wireless interface but also supplementary service—e.g. SMS (Short Message Service), CID (Caller Identification) service, wireless internet service and various applications e.g. memo, phone book, scheduler, etc.

In addition, the portable device has internal memory and stores history of voice calls, received SMS messages and personal information inputted by user.

The CID service is telephony service that displays the phone number of the caller on the screen of the user's portable device when the portable device receives the incoming call. In the CID service, in case that information corresponding to caller's phone number is stored in memory, the caller's phone number is displayed on the screen together with the corresponding information at the same time.

For example, in case that the caller's phone number, and a caller's name or an image corresponding to the caller's phone number are stored in portable device, the portable device displays the caller's phone number together with the caller's name and the image on the screen at the same time when the portable device receives the incoming call.

However, in the conventional portable device, when the incoming call is received in the portable device, the portable device displays phone number, name or image of the caller at all times. Therefore, the conventional portable device has shortcomings that the portable device causes inconvenience in using the portable device, is not able to satisfy user's expectation for display various information related to the caller, and is not able to provide personalized caller information corresponding to each caller.

DISCLOSURE OF INVENTION

Technical Problem

It is an object of the present invention to provide methods of displaying caller information of a portable device capable of displaying personalized information corresponding to each caller.

Technical Solution

A method of displaying a caller information in a portable device according to an aspect of the present invention for the purpose of the object of the present invention includes setting up an item of the caller information of each caller; and displaying the caller information based on the set item of the caller information of a caller corresponding to a phone number of the caller when the portable device receives an incoming call. The setting up an item of the caller information of each caller may include setting up a type of the each caller and setting up the item of the caller information for the set type of the each caller. The type may include at least one of a group type and an individual type. The caller information may include a caller information inputted by a user, a history of incoming call and an incoming/outgoing SMS messages of the portable device. The displaying the caller information based on the set item of the caller information of a caller corresponding to a phone number of the caller when the portable device receives an incoming call may include searching for the caller corresponding to the phone number of the caller in database when the portable device receives the incoming call and displaying the caller information corresponding to the phone number of the caller based on the set item of the caller information corresponding to the searched caller. The caller information may store in at least one of the portable device and an external server device. The method may further include updating the database after displaying the caller information.

A method of displaying a caller information of a portable device according to another aspect of the present invention for the purpose of the object of the present invention includes extracting a type of a caller from the caller information corresponding to a phone number of the caller when the portable device receives an incoming call; and displaying the caller information corresponding to the phone number based on a manner of displaying the caller information corresponding to the type of the caller. The type may include at least one of a group type and an individual type. The manner of displaying the caller information corresponding to the type of the caller may be predetermined by a user of the portable device. The manner of displaying the caller information may include setting up a type of each caller and setting up an item of the caller information corresponding to the set type of the each caller. The extracting a type of a caller from the caller information corresponding to a phone number of the caller when the portable device receives an incoming call may include searching for the caller information corresponding to the phone number of the caller in a database when the portable device receives the incoming call and extracting the type of the caller in the caller information corresponding to the phone number of the caller in the database.

A method of displaying a caller information of a portable device according to further another aspect of the present invention for the purpose of the object of the present invention includes setting up a type of each caller; setting up an item of the caller information for the set type of the each caller; and displaying the caller information corresponding to a phone number of a caller based on the set item of the caller information for the set type of the each caller. The setting up a type of each caller may include setting up at least one of a group type and an individual type. The setting up an item of the caller information may include setting up at least one of items of a caller information corresponding to the group type as the item of the caller information when the type of a caller belongs to the group type. The setting up an item of the caller information may include setting up at least one of items of a caller information corresponding to the individual type as the item of the caller information when the type of a caller belongs to the individual type.

A method of displaying a caller information of a portable device according to still another aspect of the present invention for the purpose of the first object of the present invention includes setting up a type of each caller by a user of the portable device; displaying the caller information corresponding to a phone number of a caller when the portable device receives an incoming call.

Above described function according to example embodiments of present invention may be embodied by software program, may be stored in recorded media, and may be downloaded or uploaded through network.

MODE FOR THE INVENTION

Example embodiments of the present invention will become more apparent by describing in detail example embodiments of the present invention with reference to the accompanying drawings.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Hereinafter, example embodiments of the present invention are disclosed in detail herein with reference to the accompanying drawings. Hereinafter, like numbers refer to like elements throughout the description of the figures. Detailed description of the same elements will not be repeated.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Figure 1:
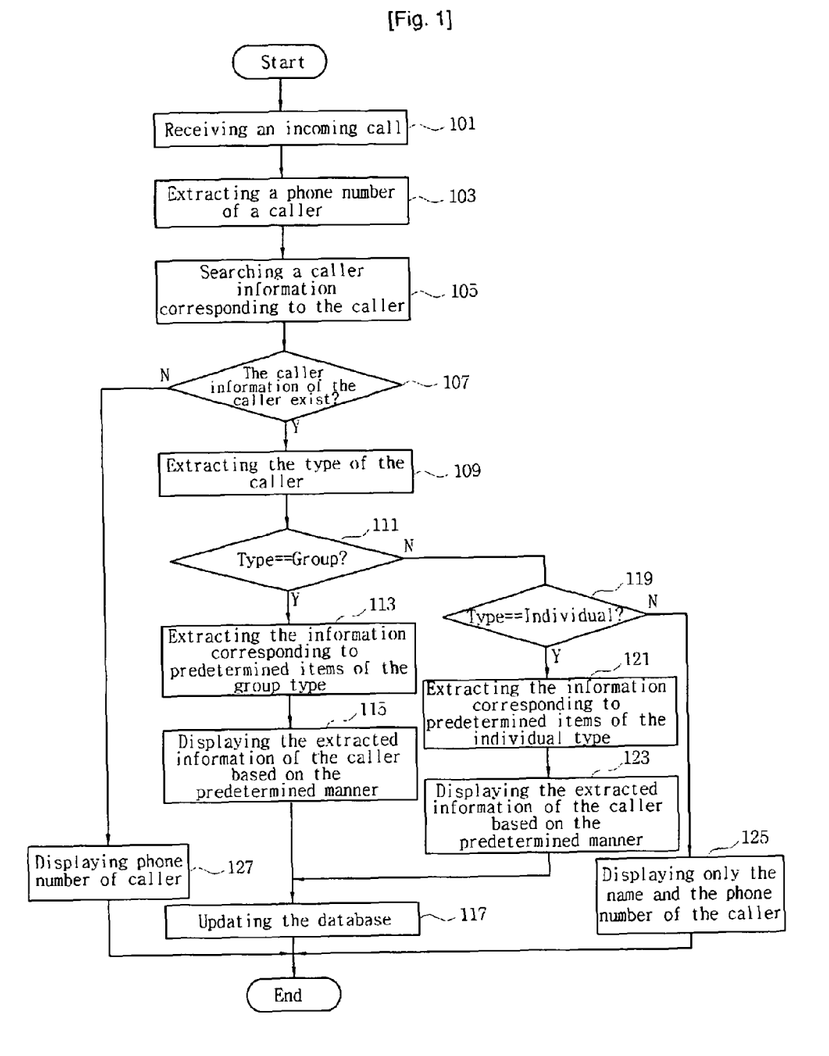
FIG. 1 is a flowchart illustrating a method of displaying caller information in a portable device according to one example embodiment of the present invention.

FIG. 1 is a flowchart illustrating a method of displaying caller information in a portable device according to one example embodiment of the present invention. It is assumed that the portable device is initialized and is in a standby status, and it is assumed that type of caller is already set up and a manner of displaying caller information corresponding to a caller's type is already set up.

First of all, the portable device receives an incoming call (Step 101), the portable device extracts a phone number of a caller from the incoming call signal (Step 103), and then the portable device searches for caller information corresponding to the caller from a database (Step 105).

In the portable device according to one example embodiment of the present invention, caller information which is inputted by a user and information, which is generated during using the portable device, such as history of incoming call, incoming/outgoing SMS messages, absent call reception history or history of outgoing call are stored in the database.

The example of the caller information which is inputted by a user is a name, a phone number, a fax number, a note, an anniversary, a birthday, a name of a company, a position in the company or an E-mail address.

The portable device judges whether or not the caller information corresponding to the phone number of the caller exists in the database (Step 107). In case that the caller information corresponding to the phone number of the caller exists in the database, the portable device extracts the type of the caller (Step 109).

The portable device according to one example embodiment of the present invention, the type of the caller is divided into a group type, an individual type, and an independence type, and the user sets the item of the caller information to be displayed.

In Step 109, in case that the type of the caller is extracted, the portable device judges whether or not the extracted type of the caller belongs to a group type (Step 111), and then, in case that the extracted type belongs to a group type, the portable device extracts the information corresponding to predetermined items of the group type from the database (Step 113).

And then, the portable device displays the extracted information and the phone number of the caller based on the predetermined manner by which items of the group type are displayed (Step 115), updates the database which stores the caller information (Step 117), and terminates the operation of the portable device for displaying caller information according to one example embodiment of the present invention.

For example, the portable device adds a present incoming call to the history of incoming calls, and in case that the portable device receives an SMS message, adds the received SMS message to the database.

In Step 111, when the caller does not belong to the group type, the portable device judges whether or not the caller belongs to the individual type (Step 119), and in case that the caller belongs to the individual type, the portable device extracts the information corresponding to predetermined items of the individual type from the database (Step 121).

And then, the portable device displays the phone number and information of the caller based on the predetermined manner by which the items of the individual type are displayed (Step 123). And then, the portable device jumps to the Step 117, in which the database is updated.

In Step 119, it is determined whether or not the caller belongs to the individual type. When the caller does not belong to the individual type, it means that the type of the caller is not determined although the information of the caller is stored in the database, and thus, the portable device displays only the name and the phone number of the caller (Step 125).

In Step 107, it is determined whether or not the information of the caller corresponding to the phone number of the caller exists in the database. When the information of the caller corresponding to the phone number of the caller does not exist in the database, it means that the user of the portable device does not store the caller information which corresponds to the phone number of the caller in the database, the portable device displays only the phone number of the caller which is extracted in the Step 103.

Figure 2:
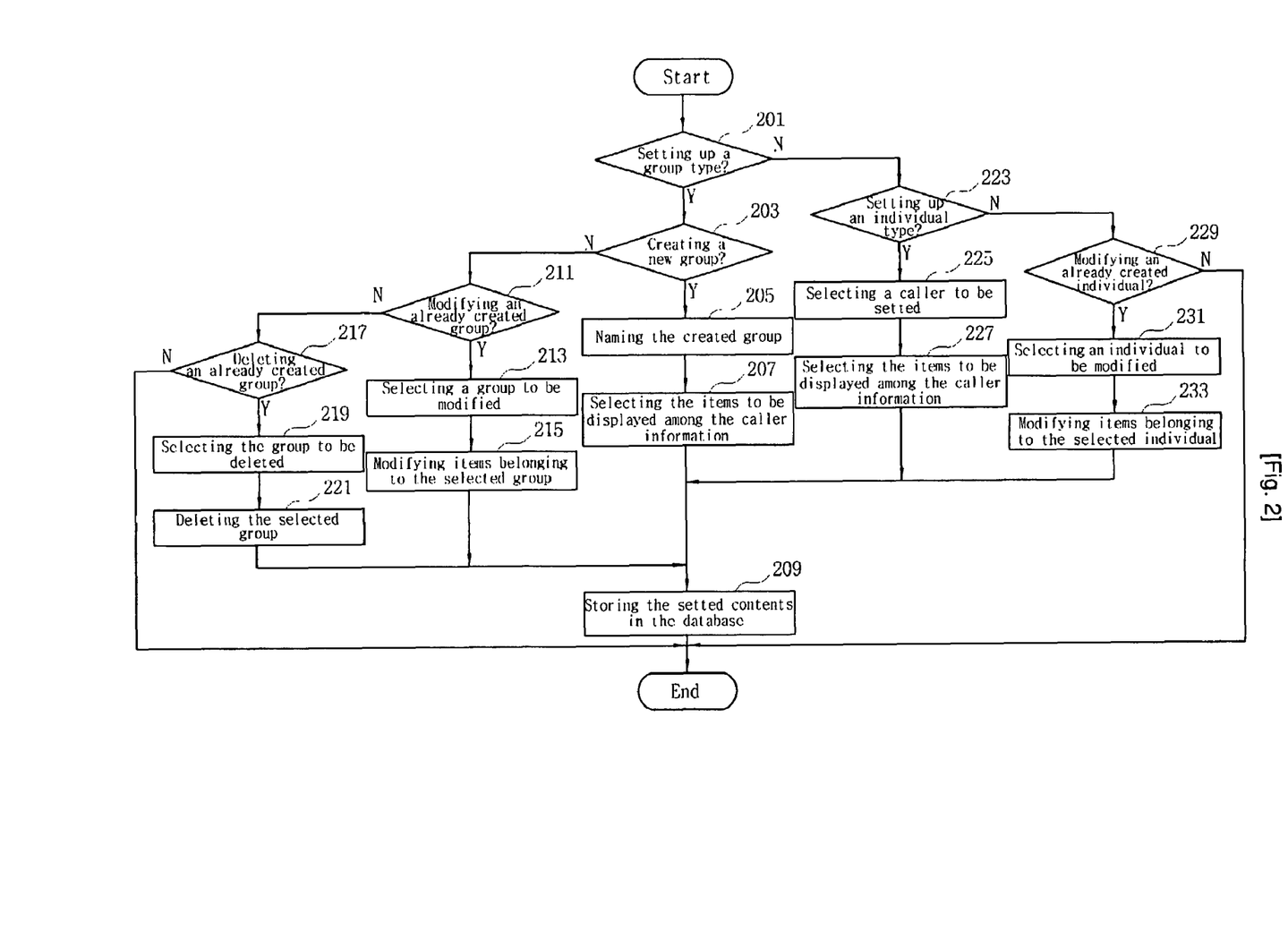
FIG. 2 is a flowchart illustrating a method of setting up a manner of displaying caller information in the portable device according to one example embodiment of the present invention.

FIG. 2 is a flowchart illustrating a method of setting up a manner of displaying caller information in the portable device according to one example embodiment of the present invention. The method of setting up a manner of displaying caller information shown in FIG. 2 is processed before the method of displaying caller information shown in FIG. 1.

The portable device judges whether or not a manner of displaying caller information is set up as a group type (Step 201). In Step 201, it is determined that the manner of displaying caller information is set up as the group type, the portable device judges whether new group is created or not (Step 203).

In Step 203, when it is determined that the new group is created, the user designates the name of the created group (Step 205), and the user selects the items to be displayed among the caller information of the caller belonging to the group type (Step 207). And then, the portable device stores the setting contents-namely, designated names and selected items—in a database so that the setting contents may not be modified irrespective of power status until the user modifies the setting contents (Step 209).

In Step 203, when it is determined that the new group is not created, the portable device judges whether an already created group is modified or not (Step 211). When it is determined that the created group is modified, then the group to be modified is selected by the user (Step 213). And the user modifies items belonging to the selected group (Step 215). And then, the portable device jumps to the Step 209 to store the setted content in the database.

In Step 211, when it is determined that the created group is not modified, the portable device judges whether an already created group is deleted or not (Step 217). When it is determined that the created group is deleted, then the group to be deleted is selected by the user (Step 219). And the user deletes the selected group (Step 221). And then, the portable device jumps to the Step 209 to store the setted content in the database.

In Step 201, when it is determined that the manner of displaying caller information is not set up as a group type, it means that the manner of displaying caller information is set up as an individual type. Thus, the portable device judges whether or not a manner of displaying caller information belonging to an individual type is set up (Step 223).

In Step 223, when it is determined that the manner of displaying caller information is set up as the individual type, the user selects a caller to be setted (Step 225), and selects items to be displayed when an incoming call is received. And then, the portable device jumps to the Step 209 to store the setted contents in the database.

In Step 223, when it is determined that the manner of displaying caller information belong to the individual type is not set up, the portable device judges whether or not the already determined manner of displaying caller information belonging to the individual type is modified (Step 229). In addition, in Step 229, when it is determined that the manner of displaying caller information is modified, an individual to be modified is selected by the user (Step 231). And the user modifies items, which belongs to selected individual, to be displayed (Step 233), and then, the portable device jumps to the Step 209 to store the setted contents in the database.

As shown in FIG. 2, in the portable device according to one example embodiment of the present invention, the user classifies the type of caller into the group type and individual type, and selects items to be displayed based on each type. Therefore, the portable device displays the caller information based on items, which is selected by the user, to be displayed.

Figure 3:
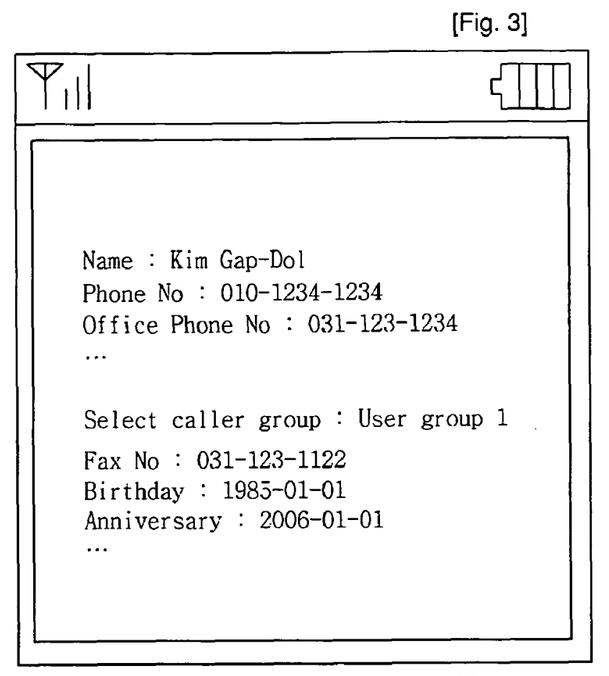
FIGS. 3 and 4 are views illustrating a user interface through which individual information is inputted and a user interface through which a type of each individual is set up in the portable device.
Figure 4:
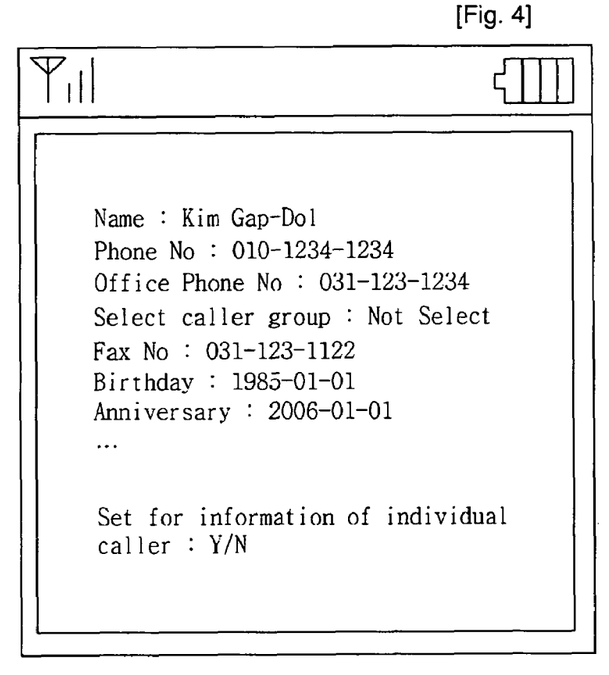

FIGS. 3 and 4 are views illustrating a user interface through which individual information is inputted and a user interface through which a type of each individual is set up in the portable device.

Referring to FIGS. 3 and 4, a user of the portable device inputs information such as a name, a mobile phone number, an office phone number, a fax number, a birthday, an anniversary, etc. using an application program such as a phone book, an address book, and then designates a group in 'Select caller group' item.

In case that the user does not designate 'Select caller group' item as a group, then, as shown in FIG. 4, the user determines whether or not the information of the caller inputted at 'Set for information of individual caller' item is set as an individual type.

In case that the user selects 'Y' at 'Set for information of individual caller' item, the inputted caller is set as an individual type. In case that the user selects 'N' at 'Set for information of individual caller' item, the inputted caller does not belong to the group type nor the individual type.

In addition, the user may directly input a group name in 'Select caller group' item shown in FIG. 3, or may select one group name among predefined group names.

In one example embodiment of the present invention shown in FIGS. 3 and 4, when a user inputs information of the caller, the inputted information may be classified according to callers to be stored in database. In addition, the information, which is not inputted by user but is generated during using the portable device such as history of incoming call, absent call reception history or incoming/outgoing SMS message, may be classified according to callers to be stored in database.

FIGS. 5, 6, 7 and 8 are views illustrating user interfaces through which a manner for displaying caller information of a caller belonging to a group type is set up in the portable device according to one example embodiment of the present invention.

Figure 5:
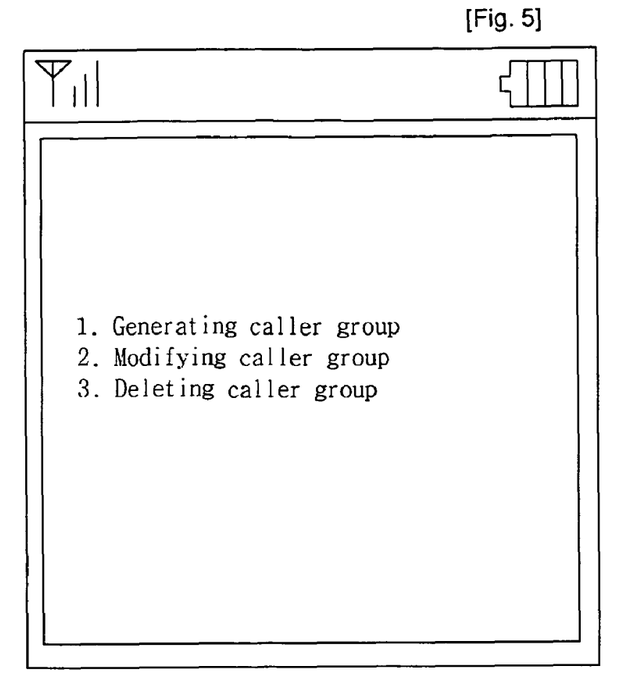
FIGS. 5, 6, 7 and 8 are views illustrating user interfaces through which a manner for displaying caller information of a caller belonging to a group type is set up in the portable device according to one example embodiment of the present invention.
Figure 6:
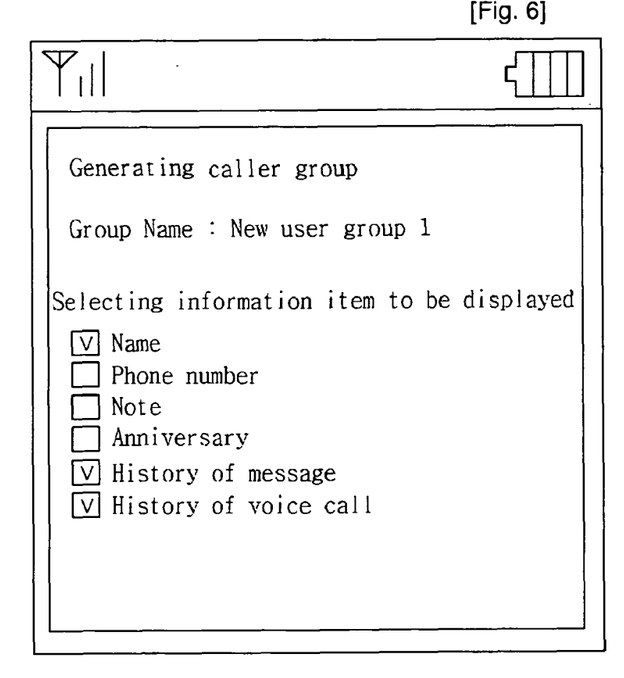

Referring to FIGS. 5, 6, 7 and 8, a user selects an item for setting a group among the items of an initial menu shown in FIG. 5. And, in case the user selects the 'Generating caller group', the user inputs a new name in 'Group name' item, and selects information item to be displayed in caller information shown in FIG. 6.

Figure 7:
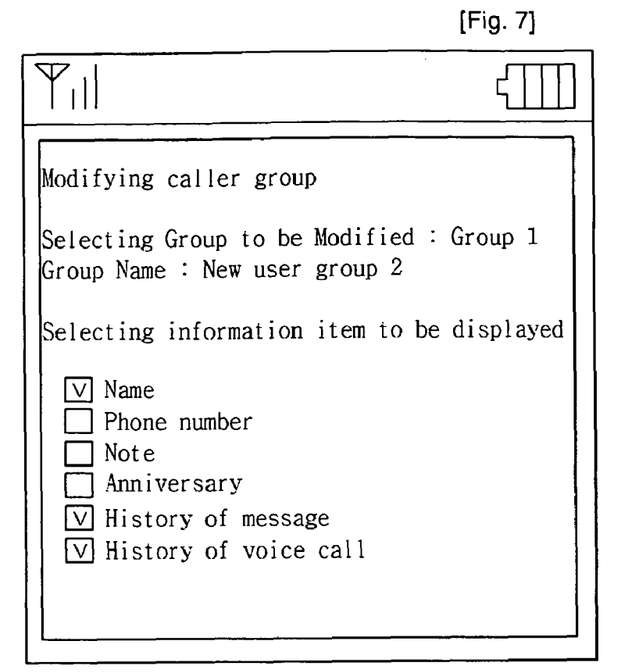
Figure 8:
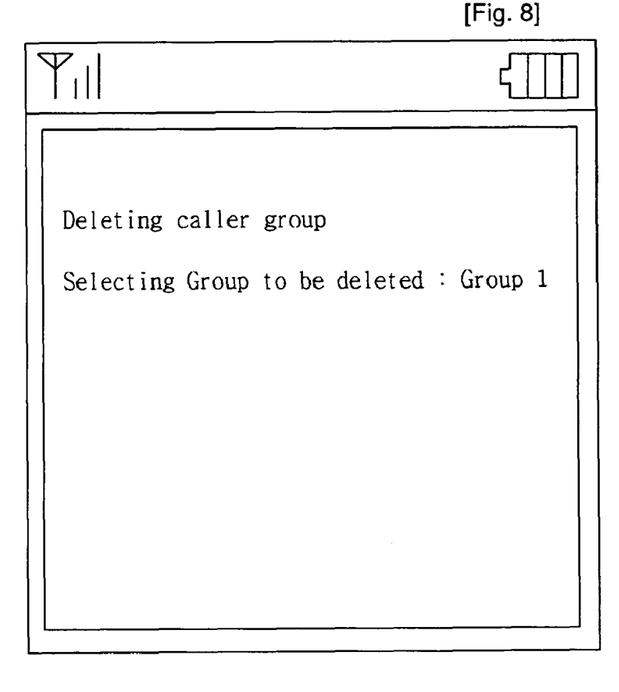

In case that the user selects 'Modifying caller group' the user selects a group to be modified among the created groups in 'Select group to be modified' item, and modifies the group name, and/or information item to be displayed as shown in FIG. 7. In case that the user selects 'Deleting caller group', the user selects the group to be deleted and deletes the selected group as shown in FIG. 8.

Figure 9:
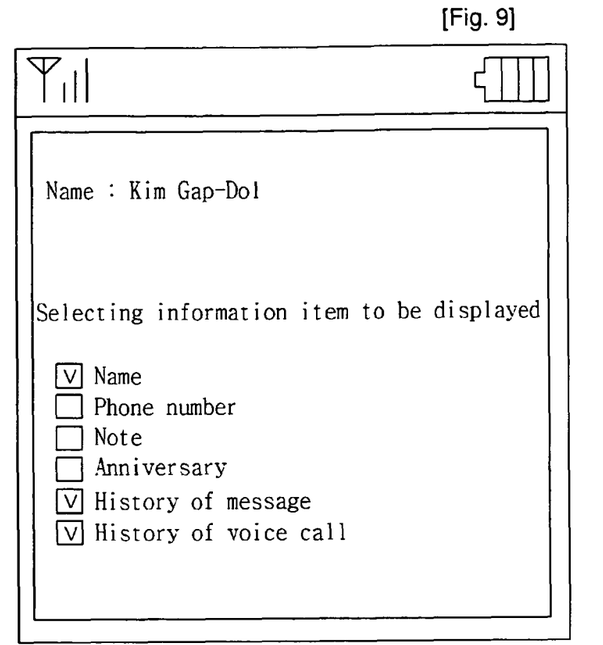
FIG. 9 is a view illustrating a user interface through which a manner for displaying caller information of a caller belonging to an individual type is set up in the portable device according to one example embodiment of the present invention.

FIG. 9 is a view illustrating a user interface through which a manner for displaying caller information of a caller belonging to an individual type is set up in the portable device according to one example embodiment of the present invention. Referring to FIG. 9, the user selects the information item to be displayed when the portable device receives incoming call from a caller which belongs to the individual type.

Figure 10:
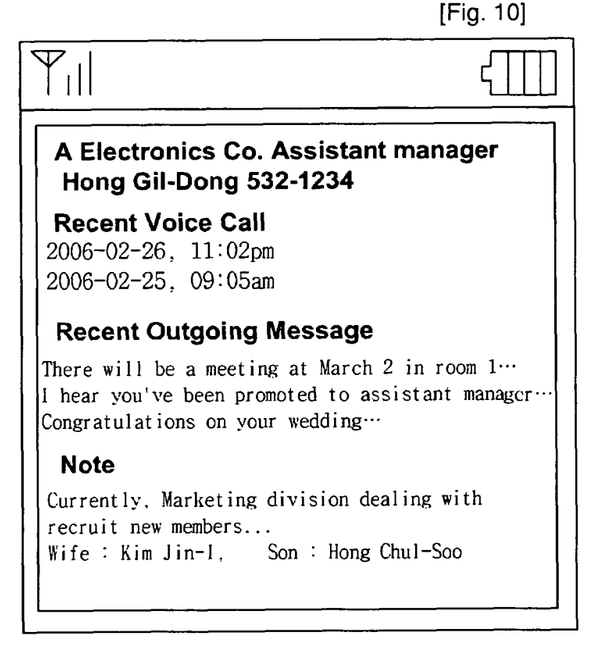
FIGS. 10 and 11 are views illustrating user interfaces that display caller information belonging to a group type in the portable device.
Figure 11:
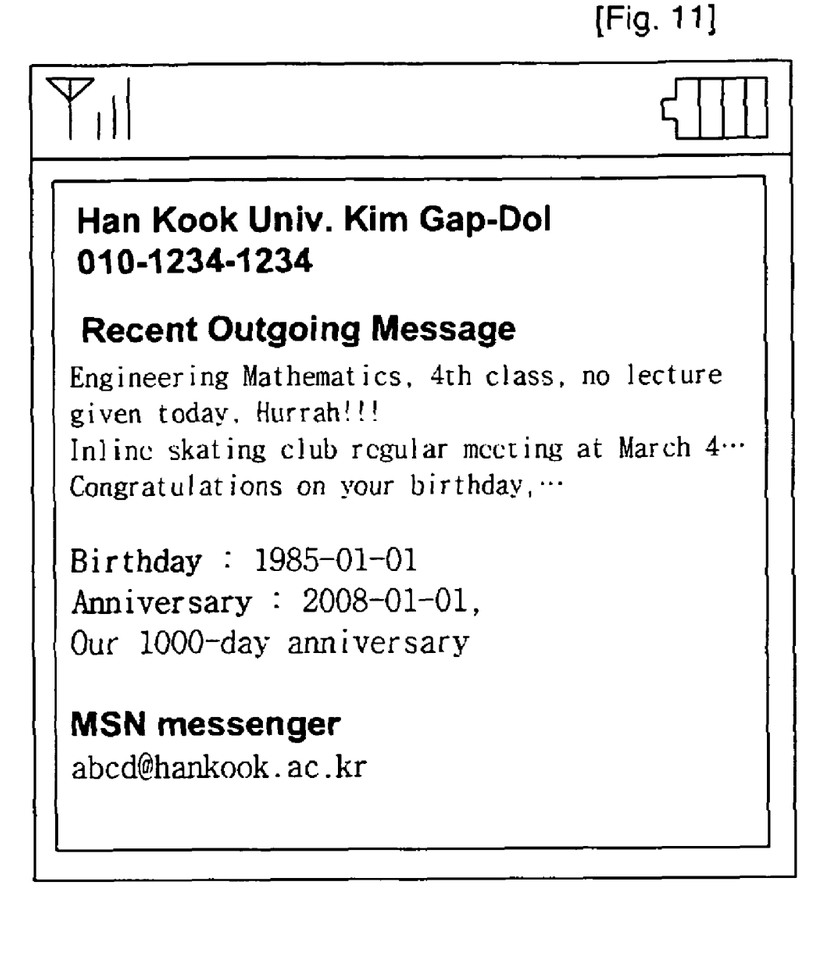

FIGS. 10 and 11 are views illustrating user interfaces that display caller information belonging to a group type in the portable device.

Referring to FIGS. 10 and 11, FIG. 10 shows an user interface when the portable device receives the incoming call from a caller belonging to a business group type. FIG. 11 shows an user interface when the portable device receives the incoming call from a caller belonging to a friend group type.

As shown in FIGS. 10 and 11, in the method of displaying caller information of portable device according to an example embodiment of the present invention, the type of the caller is predetermined, the information items to be displayed is set up depending upon the predetermined group type, and thus the user may acquire caller information that is necessary for the user and is required by the user.

Although above example embodiments of the method of displaying caller information of portable device shows that the caller information related to the caller is stored in database of memory of the portable device, the caller information may be stored in a database of an external sever device according to another example embodiment of the present invention. Particularly, a user or an another user may access the external server device through a network, and may set caller information related to the caller so that the caller information related to the caller may be stored in database. And then, in case that the incoming call is received in the portable device, the portable device may access the external server and obtains the caller information from the database in real-time.

INDUSTRIAL APPLICABILITY

According to the method of displaying caller information of portable device, the user of the portable device sets up types of callers per every caller and a manner of displaying caller information corresponding to types of the callers and/or the callers is set up, the caller information is displayed on the screen according to the predefined manner of displaying caller information when the portable device receives the incoming call.

Accordingly, caller information desired by the user of the portable device may be display, and thus various and personalized caller information may be displayed.

The invention claimed is:

1. A method of displaying a caller information on a portable device, comprising:
    searching a database for a caller based on a phone number of the caller when the portable device receives an incoming call from the caller; and
    displaying the caller information, the caller information including at least one information item that is preset to be displayed in the caller information, the at least one information item depending on a group including the caller,
        wherein the at least one information item includes one of caller details, a history of incoming calls, and incoming and outgoing Short Message Service (SMS) messages of the portable device.

2. The method of claim 1, wherein an incoming caller that does not belong to the group is classified as an individual caller.

3. The method of claim 1, wherein the caller information is stored in at least one of the portable device and an external server device.

4. The method of claim 1, further comprising:
    updating the database after displaying the caller information, wherein the updating updates the database with the information of the incoming call.

5. The method of claim 1, wherein the group the caller belongs to is extracted from the database.

6. A method of displaying a caller information in a portable device, comprising:
    setting a group each caller belongs to;
    selecting at least one information item that is displayed as the caller information depending on the set group; and
    displaying the caller information corresponding to a phone number of a caller when an incoming call is received, the caller information including the selected item.

* * * * *